(No Model.)

C. F. SCOTT.
METHOD OF ECONOMIZING THE ENERGY OF ALTERNATING CURRENTS.

No. 520,970. Patented June 5, 1894.

WITNESSES:
George Brown
Hubert C. Tener

INVENTOR
Charles F. Scott
BY
Kerry and MacKay
ATTORNEYS

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF SAME PLACE.

METHOD OF ECONOMIZING THE ENERGY OF ALTERNATING CURRENTS.

SPECIFICATION forming part of Letters Patent No. 520,970, dated June 5, 1894.

Application filed August 7, 1893. Serial No. 482,605. (No model.)

*To all whom it may concern:*

Be it known that I, CHARLES F. SCOTT, a citizen of the United States, residing in Pittsburg, in the county of Allegheny and State of Pennsylvania, have invented a new and useful Improvement in Methods of Economizing the Energy of Alternating Currents, (Case No. 564,) of which the following is a specification.

My invention relates to alternating current systems of electrical distribution where converters or transformers are employed for the purpose of modifying the potential of current supplied at branches or points of translation.

The object of my invention is the production of means whereby those systems or portions of systems which are run on light load or on practically no load for a large portion of the time may be operated with a minimum loss in iron and copper of the converters.

My invention is useful in those cases in which converters are connected continuously to primary circuits and wherein the secondary is fully loaded during only a small portion of the time, and at other times is either very lightly loaded or carries no load. The total loss in such a converter is made up of iron loss during the whole time and a copper loss for the few hours during which the converter is fully loaded. There is also present an insignificant copper loss during times of light load. A very large proportion of the total loss in the converter, therefore, occurs in the iron when there is little or no load on the secondary.

My invention is designed to cut down very considerably the iron loss while the converter is supplying light loads, and yet leave the apparatus so disposed that the whole ratio of conversion is suitable and available for supplying a few lights continually. The problem to be solved, therefore, is the greatest possible reduction of iron loss when the converter is doing but little work, together with the maintenance of the proper ratio of conversion at all times, so that the lights may be burned continuously and the apparatus may adjust itself automatically for carrying the larger loads when they are thrown on.

My invention is illustrated in the accompanying drawings, in which—

Figure 1:
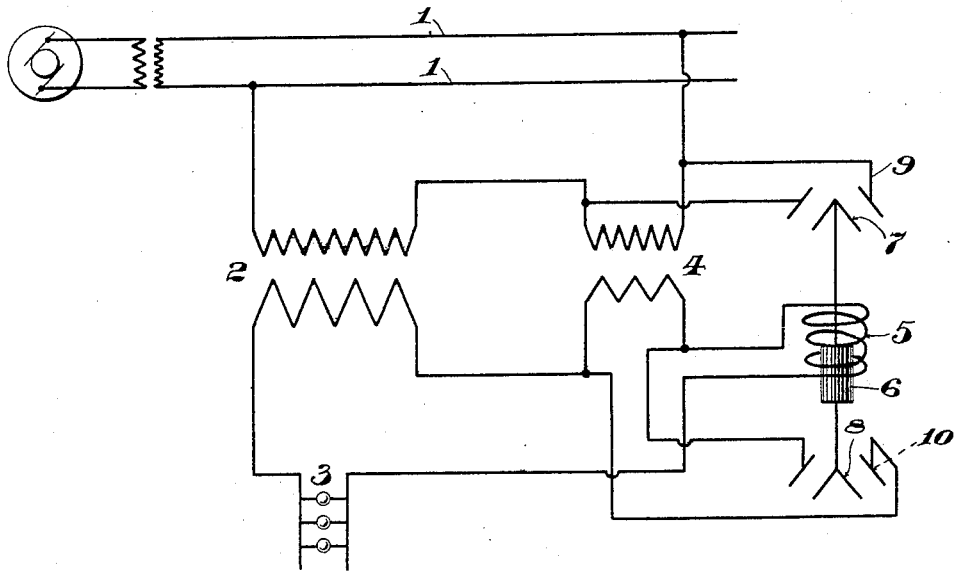
Figure 2:
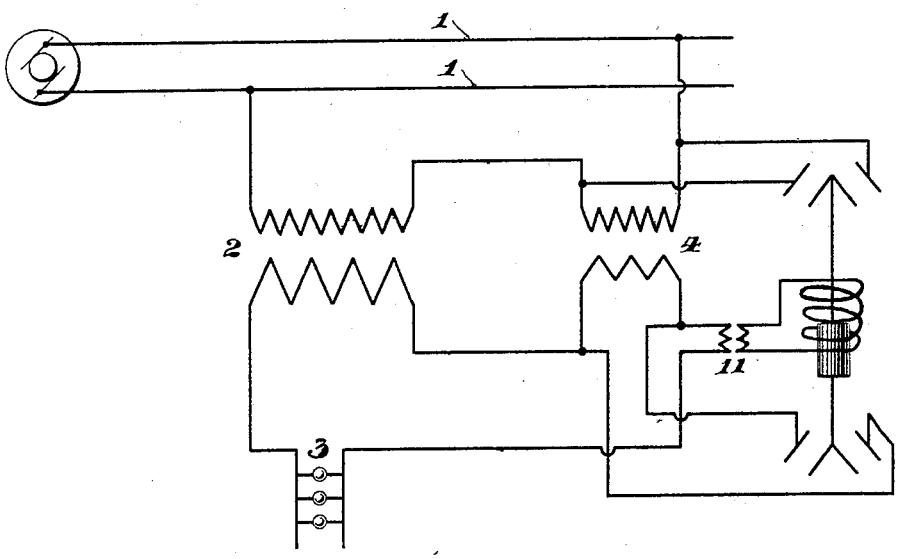

Figure 1 is a diagrammatic view of the main and auxiliary converters of the cut-out device, and Fig. 2 is a diagrammatic view of a modification for the production of further economy in the use of the cut-out device.

In the drawings the supply circuit is shown at 1, and may be supplied in any manner well known in the art, either directly from the generator or from a transformer. This supply circuit feeds any desired number of transformers, one of which is shown at 2, the secondary of such transformer being used to supply translating devices indicated at 3.

In the practice of my invention I use an auxiliary converter, 4, the primary of which I place in series with the primary of the main or feeding converter 2, and the secondary of which is placed in series with the secondary of such main converter. The capacity of the auxiliary converter is considerably less than that of the main or feeding converter, and for example I will suppose that the ratio of capacities is as one to ten. The ratio of conversion in the two converters I make the same; the secondary will, therefore, have the proper electro-motive force. As load is placed on the system the two converters act in series and hence the electro-motive force will drop rapidly as more work is called for, owing to the considerable resistance in this series circuit. The drop in the large converter will be very small compared with that in the auxiliary converter owing to its smaller resistance and the drop in the auxiliary converter will reach the allowable limit at one-tenth of the capacity of the large converter. The two converters in series are therefore capable of supplying one-tenth of the load of the large converter. The iron loss when the two converters are connected in series will be less than that in the small converter alone when used under normal conditions and consequently very much less, probably not over ten or twenty per cent. of that in the large converter under normal conditions.

My invention contemplates the cutting out of the auxiliary converter when the load has reached one-tenth of the capacity of the large converter and the drop has thus reached the allowable limit. This I accomplish by short-circuiting both the primary and secondary of the auxiliary converter. This will leave the large converter connected directly to the main and supply its load under normal conditions just as it would if the auxiliary converter had not been used. In order to accomplish this various devices may be employed and such devices may be either automatic or may be operated by hand upon indication of the currents of the proper load. The construction which I prefer to employ is indicated diagrammatically in Figs. 1 and 2, and consists of a solenoid 5 placed in series with the secondaries of the two converters and also in a normally open branch around the secondary of the auxiliary converter. This solenoid is adapted to operate upon a properly constructed core 6, whereby bridging devices 7 and 8 are caused to close the short-circuits 9 and 10 around the primary and secondary of the auxiliary converter respectively. The solenoid is thus seen to be always in series with the secondary of the main converter and to be also in series with the secondary of the auxiliary converter when a current below the critical point (in the example above used, one-tenth of the full load) is employed. The result of this construction is that when the load has passed the critical point, the solenoid operates the core 6 to short-circuit both primary and secondary of the auxiliary converter, and thus accomplishes the object above set forth. The resistance of the short-circuiting device to closure by the solenoid may be adjusted in any well known manner, either by gravity or the resistance of springs. This requires no illustration, as it is a well known feature in all kinds of electrical work.

The form shown in Fig. 1 is to a certain extent objectionable, because the solenoid 5 must act with one tenth of the maximum current which it must carry at full load. It therefore must be wound with such a resistance as will cause an objectionable heating and loss of energy when the full load is being taken from the converter. This excess of current between which the solenoid must act and that which must be carried at full load may be obviated by the following device shown at Fig. 2.

Either the primary or secondary current, as may be desired, is passed in series with the primary or secondary of the converters through a small converter, which for convenience I shall call the short-circuiting converter, the secondary of which supplies the solenoid of the short-circuiting device. In Fig. 2 this short-circuiting converter is shown at 11, and its primary is shown as being in series with the secondary of the system. This converter is so designed that the iron is quite near saturation when the current has reached the proper amount for the solenoid to act. Thus a further increase in the primary current of this converter will cause the iron to become saturated and thus permit any further amount of current to flow through readily without considerable further increase in counter electro-motive force in the primary and without materially increasing the electro-motive force and current in the secondary which supplies the solenoid. The occurrence of saturation is not, as is well known, an instantaneous one and the relation of the operating current to the point of saturation is not a rigid one. Some degree of saturation may even occur a little before the operation of the short-circuiting device without departing from the spirit of my invention. It is merely essential that a current greater than that necessary for operation of the short-circuiting device, should produce saturation of the short-circuiting converter core to such an extent as to prevent injurious rise of current in the solenoid which moves the short-circuiting device. It is moreover quite evident that the use of my invention, so far as regards the device which I have called herein the "short-circuiting converter" is not confined to the particular connection above described, but is applicable to every and all cases wherein it is necessary to permanently supply current to auxiliary translating devices (in this case the solenoid 5) intended to operate under the influence of a small percentage of the current normally employed by main translating devices (herein the main converter and auxiliary converter 2 and 4) with which such auxiliary translating devices are continuously in circuit. This broad view of this feature of my invention is claimed in claim 2.

It is evident that the details of my entire invention are susceptible of considerable variations in detail, and I do not desire to be understood as limiting myself to the particular arrangement shown and described herein. The converters as indicated in the drawings are step-down converters, but of course the ratio of conversion and the direction as to increase or decrease are immaterial.

What I claim is—

1. In alternating current systems of distribution by converters, a feeding or main converter, translating devices in the secondary thereof, an auxiliary converter having its primary and secondary in series respectively with the primary and secondary of the main converter, and means whereby said auxiliary converter may be short-circuited, substantially as described.

2. As a means for supplying operating current to auxiliary translating devices intended to operate under the influence of a small percentage of the current normally employed by main translating devices with which such auxiliary translating devices are continuously in circuit; a converter having its primary in circuit with the main translating devices and its secondary in circuit with the auxiliary translating device, said converter being so proportioned that its core will be saturated upon the passage of a greater current than that necessary for operating the auxiliary translating device.

3. In alternating current systems of distribution by converters, a main converter having translating devices in its secondary circuit, an auxiliary converter having its primary and secondary respectively in series with the primary and secondary of the main converter, normally open short circuits around the primary and secondary of the auxiliary converter and means adapted to be operated by increase of current in the system whereby said short-circuits may be closed, substantially as described.

4. In alternating current systems of distribution by converters, a main converter having translating devices in circuit with its secondary, an auxiliary converter having its primary and secondary in circuit respectively with the primary and secondary of the main converter, normally open short-circuits around the primary and secondary of said auxiliary converter, a magnetic core carrying bridging pieces for closing said short-circuits upon operation, and a solenoid for operating said core for the purpose of so closing said short-circuits, said solenoid being in circuit with one of the coils of the main converter.

5. In alternating current systems of distribution by converters, a main converter having translating devices in circuit with its secondary, an auxiliary converter having its primary and secondary in circuit respectively with the primary and secondary of the main converter, normally open short - circuits around the primary and secondary of said auxiliary converter, means for closing said short-circuits adapted to be operated by the passage of current, a short-circuiting converter having its primary in circuit with one of the coils of the main converter and its secondary supplying current for operating a short-circuiting device, said short-circuiting converter being so designed that its core may be saturated upon passage of a greater quantity of current than that necessary for operating the short-circuiting device, substantially as described.

In testimony whereof I have hereunto subscribed my name this 3d day of August, A. D. 1893.

CHAS. F. SCOTT.

Witnesses:
GEORGE BROWN, Jr.,
JAMES WM. SMITH.